US010749737B2

(12) United States Patent
Roy et al.

(10) Patent No.: US 10,749,737 B2
(45) Date of Patent: *Aug. 18, 2020

(54) INTEROPERABILITY GATEWAY FOR LAND MOBILE RADIO SYSTEM

(71) Applicant: E.F. Johnson Company, Irving, TX (US)

(72) Inventors: Arindam Roy, Plano, TX (US); Brandon Hudson Yarbrough, Richardson, TX (US); Jon Bartosch, Rowlett, TX (US); Steven Newman, Lincoln, NE (US)

(73) Assignee: E.F. JOHNSON COMPANY, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/262,781

(22) Filed: Jan. 30, 2019

(65) Prior Publication Data

US 2019/0165995 A1 May 30, 2019

Related U.S. Application Data

(63) Continuation of application No. 15/786,476, filed on Oct. 17, 2017, now Pat. No. 10,212,026, which is a
(Continued)

(51) Int. Cl.
*H04L 12/24* (2006.01)
*H04L 12/703* (2013.01)
(Continued)

(52) U.S. Cl.
CPC ...... *H04L 41/0668* (2013.01); *H04L 43/0811* (2013.01); *H04L 45/28* (2013.01); *H04W 24/04* (2013.01)

(58) Field of Classification Search
CPC combination set(s) only.
See application file for complete search history.

(56) References Cited

U.S. PATENT DOCUMENTS

| | | | |
|---|---|---|---|
| 4,870,408 | A | 9/1989 | Zdunek et al. |
| 5,113,413 | A | 5/1992 | Brown et al. |

(Continued)

FOREIGN PATENT DOCUMENTS

| | | | |
|---|---|---|---|
| DE | 4434372 | A1 | 3/1996 |
| DE | 10104926 | A1 | 11/2001 |

(Continued)

OTHER PUBLICATIONS

Alcober, J. et al., "Multi-site Model and Simulation of Trunking Systems," 5th IEEE International Conference on Universal Personal Communications, 1996, pp. 236-239, Universitat Politecnica de Catalunya, Barcelona.
(Continued)

*Primary Examiner* — Yee F Lam
(74) *Attorney, Agent, or Firm* — Foley & Lardner LLP

(57) ABSTRACT

Disclosed is an interoperability gateway system that provides backup connection between a dispatch center and a Land Mobile Radio (LMR) system in the event the dispatch center is disconnected from the LMR system. In general, this may be accomplished by providing an RF link between the disconnected site and the interoperability gateway via a controller, or interoperability site network interface (ISNI), that is activated when the dispatch center is disconnected from the LMR system. The interoperability gateway provides the backup connection by allocating a control station for each channel available at the disconnected LMR system. When compared to conventional dispatch console backup schemes, the disclosed interoperability gateway system greatly reduces the equipment needed to provide dispatch console backup, thereby decreasing equipment and opera-
(Continued)

tion costs, and simplifying operation by providing a solution that is virtually transparent to the dispatcher.

11 Claims, 7 Drawing Sheets

Related U.S. Application Data continuation of application No. 14/815,095, filed on Jul. 31, 2015, now Pat. No. 9,800,460.

(60) Provisional application No. 62/032,376, filed on Aug. 1, 2014.

(51) Int. Cl.
*H04L 12/26* (2006.01)
*H04W 24/04* (2009.01)

(56) References Cited

U.S. PATENT DOCUMENTS

| | | | |
|---|---|---|---|
| 5,214,789 A | | 5/1993 | George |
| 5,274,838 A | * | 12/1993 | Childress ............... H04W 84/08 455/17 |
| 5,293,638 A | | 3/1994 | Sasuta et al. |
| 5,420,909 A | | 5/1995 | Ng et al. |
| 5,455,965 A | | 10/1995 | Shaughnessy et al. |
| 5,542,119 A | | 7/1996 | Grube et al. |
| 5,548,802 A | | 8/1996 | Barnes et al. |
| 5,594,940 A | | 1/1997 | Peterson et al. |
| 5,613,196 A | | 3/1997 | Barnes et al. |
| 5,815,799 A | | 9/1998 | Barnes et al. |
| 5,850,444 A | | 12/1998 | Rune |
| 5,901,341 A | | 5/1999 | Moon et al. |
| 5,917,811 A | | 6/1999 | Weaver et al. |
| 6,028,846 A | | 2/2000 | Cain |
| 6,119,010 A | | 9/2000 | Labedz |
| 6,134,514 A | | 10/2000 | Liu et al. |
| 6,134,515 A | | 10/2000 | Skogby |
| 6,141,347 A | | 10/2000 | Shaughnessy et al. |
| 6,199,032 B1 | | 3/2001 | Anderson |
| 6,336,035 B1 | | 1/2002 | Somoza et al. |
| 6,374,115 B1 | | 4/2002 | Barnes et al. |
| 6,529,486 B1 | | 3/2003 | Barnes et al. |
| 6,545,995 B1 | | 4/2003 | Kinnunen et al. |
| 6,571,082 B1 | | 5/2003 | Rahman et al. |
| 6,618,696 B1 | | 9/2003 | Dean et al. |
| 6,684,080 B1 | | 1/2004 | Barnes et al. |
| 6,744,746 B1 | | 6/2004 | Bartelme |
| 6,754,224 B1 | | 6/2004 | Murphy |
| 6,771,703 B1 | | 8/2004 | Oguz et al. |
| 6,771,966 B1 | | 8/2004 | Chow |
| 6,813,593 B1 | | 11/2004 | Berger |
| 6,822,947 B2 | | 11/2004 | Sawyer et al. |
| 6,898,188 B1 | | 5/2005 | Hamami |
| 6,934,555 B2 | | 8/2005 | Silva et al. |
| 6,940,838 B1 | | 9/2005 | Stead |
| 6,941,457 B1 | | 9/2005 | Gundavelli et al. |
| 6,985,735 B2 | | 1/2006 | Gustafsson |
| 6,996,510 B1 | | 2/2006 | Reilly et al. |
| 7,006,467 B2 | | 2/2006 | Anton, Jr. et al. |
| 7,035,643 B2 | | 4/2006 | Slawitschka et al. |
| 7,056,217 B1 | | 6/2006 | Pelkey et al. |
| 7,075,893 B1 | | 7/2006 | Mlinarsky et al. |
| 7,080,147 B2 | | 7/2006 | Wang et al. |
| 7,113,791 B2 | | 9/2006 | Lepschy et al. |
| 7,120,432 B2 | | 10/2006 | Voyer |
| 7,133,679 B2 | | 11/2006 | Zhu |
| 7,184,790 B2 | | 2/2007 | Dorenbosch et al. |
| 7,218,620 B2 | | 5/2007 | Lee |
| 7,221,660 B1 | | 5/2007 | Simonson et al. |
| 7,231,330 B2 | | 6/2007 | Hernandez-Mon Dragon et al. |
| 7,236,779 B2 | | 6/2007 | Lahav et al. |
| 7,246,055 B1 | | 7/2007 | Singh |
| 7,251,456 B2 | | 7/2007 | Chiu |
| 7,263,471 B2 | | 8/2007 | Barbaresi et al. |
| 7,277,395 B2 | | 10/2007 | Rosen et al. |
| 7,308,268 B2 | | 12/2007 | Barbosa Da Torre et al. |
| 7,324,588 B2 | | 1/2008 | Green et al. |
| 7,379,740 B2 | | 5/2008 | Da Torre et al. |
| 7,386,435 B2 | | 6/2008 | Sutinen et al. |
| 7,403,779 B2 | | 7/2008 | De Cambray-Mathan |
| 7,433,692 B2 | | 10/2008 | De Santis et al. |
| 7,486,636 B2 | | 2/2009 | Francalanci et al. |
| 7,564,805 B1 | | 7/2009 | Cortez et al. |
| 7,596,377 B2 | | 9/2009 | Barberis et al. |
| 7,636,339 B2 | | 12/2009 | Shaffer et al. |
| 7,639,988 B2 | | 12/2009 | Abusch-Magder et al. |
| 7,664,846 B2 | | 2/2010 | Tiruthani |
| 7,672,669 B2 | | 3/2010 | Alexander et al. |
| 7,698,121 B2 | | 4/2010 | Steenkiste et al. |
| 7,729,287 B2 | | 6/2010 | Griffiths |
| 7,738,407 B2 | | 6/2010 | Chow et al. |
| 7,747,248 B2 | | 6/2010 | Escott |
| 7,747,249 B2 | | 6/2010 | Guo et al. |
| 7,760,660 B2 | | 7/2010 | Conway |
| 7,764,633 B2 | | 7/2010 | Marque-Pucheu |
| 7,765,093 B2 | | 7/2010 | Li et al. |
| 7,770,068 B2 | | 8/2010 | Drees |
| 7,783,463 B2 | | 8/2010 | Herro |
| 7,796,983 B2 | | 9/2010 | Pao et al. |
| 7,809,659 B1 | | 10/2010 | Paiz |
| D636,361 S | | 4/2011 | Frandsen et al. |
| 7,929,475 B2 | | 4/2011 | Simonson et al. |
| 7,970,425 B2 | | 6/2011 | Balachandran et al. |
| 8,045,499 B2 | | 10/2011 | Wiatrowski et al. |
| 8,059,574 B2 | | 11/2011 | Roy et al. |
| 8,160,076 B1 | | 4/2012 | Aggarwal et al. |
| 8,255,684 B2 | | 8/2012 | Benshetler et al. |
| 8,352,223 B1 | | 1/2013 | Anthony et al. |
| 8,483,114 B2 | | 7/2013 | Roy et al. |
| 8,694,774 B2 | | 4/2014 | Benshetler et al. |
| 9,148,421 B2 | | 9/2015 | Benshetler et al. |
| 9,252,982 B2 | | 2/2016 | Jobe et al. |
| 9,516,475 B2 | | 12/2016 | Roy et al. |
| 9,763,260 B2 | | 9/2017 | Bane et al. |
| 9,774,386 B2 | | 9/2017 | Roy et al. |
| 9,800,460 B2 | | 10/2017 | Roy et al. |
| 10,004,082 B2 | | 6/2018 | Bane et al. |
| 10,117,111 B2 | | 10/2018 | Jobe et al. |
| 10,212,026 B2 | | 2/2019 | Roy et al. |
| 10,461,846 B2 | | 10/2019 | Roy et al. |
| 10,548,025 B2 | | 1/2020 | Jobe et al. |
| 2001/0010689 A1 | | 8/2001 | Awater et al. |
| 2002/0067408 A1 | | 6/2002 | Adair et al. |
| 2002/0114302 A1 | | 8/2002 | McDonald et al. |
| 2002/0155839 A1 | | 10/2002 | Nisbet |
| 2003/0016834 A1 | | 1/2003 | Blanco et al. |
| 2003/0058858 A1 | | 3/2003 | Berlyoung et al. |
| 2003/0063569 A1 | | 4/2003 | Kalliokulju et al. |
| 2003/0086405 A1 | | 5/2003 | Silva et al. |
| 2003/0095510 A1 | | 5/2003 | Dorenbsoch |
| 2004/0070515 A1 | | 4/2004 | Burkley et al. |
| 2004/0132453 A1 | | 7/2004 | Gabriel et al. |
| 2004/0170149 A1 | | 9/2004 | Lee |
| 2004/0190483 A1 | | 9/2004 | Shahaf et al. |
| 2004/0214577 A1 | | 10/2004 | Borst et al. |
| 2004/0214583 A1 | | 10/2004 | Graham et al. |
| 2005/0165919 A1 | | 7/2005 | Qian et al. |
| 2005/0174986 A1 | | 8/2005 | Emond et al. |
| 2005/0180448 A1 | | 8/2005 | Kobayashi |
| 2005/0198359 A1 | | 9/2005 | Basani et al. |
| 2005/0233751 A1 | | 10/2005 | Bardwell |
| 2005/0250523 A1 | | 11/2005 | Lemke et al. |
| 2005/0267928 A1 | | 12/2005 | Anderson et al. |
| 2005/0281208 A1 | | 12/2005 | Dorenbosch et al. |
| 2005/0282590 A1 | | 12/2005 | Haparnas |
| 2006/0140125 A1 | | 6/2006 | Ottinger et al. |
| 2006/0160562 A1 | | 7/2006 | Davis et al. |
| 2006/0205398 A1 | | 9/2006 | Seckendorf et al. |
| 2006/0211443 A1 | | 9/2006 | Wegman |
| 2006/0217120 A1 | | 9/2006 | Annunziato et al. |
| 2006/0217122 A1 | | 9/2006 | Levit et al. |

(56) References Cited

U.S. PATENT DOCUMENTS

| | | |
|---|---|---|
| 2006/0221937 A1 | 10/2006 | Olivier et al. |
| 2006/0240814 A1 | 10/2006 | Cutler |
| 2006/0262800 A1 | 11/2006 | Martinez et al. |
| 2006/0274659 A1 | 12/2006 | Ouderkirk |
| 2006/0282247 A1 | 12/2006 | Brennan et al. |
| 2007/0014263 A1 | 1/2007 | Ferrato et al. |
| 2007/0019769 A1 | 1/2007 | Green et al. |
| 2007/0061442 A1 | 3/2007 | Kan et al. |
| 2007/0072619 A1 | 3/2007 | Wei et al. |
| 2007/0104121 A1 | 5/2007 | Shaffer et al. |
| 2007/0147296 A1 | 6/2007 | Barbaresi et al. |
| 2007/0147357 A1 | 6/2007 | Pelletier et al. |
| 2007/0160181 A1 | 7/2007 | Barbaresi et al. |
| 2007/0242670 A1 | 10/2007 | Simonson et al. |
| 2007/0259692 A1 | 11/2007 | Venkatachalam |
| 2007/0263597 A1 | 11/2007 | Morinaga et al. |
| 2007/0263798 A1 | 11/2007 | Dewing et al. |
| 2007/0293159 A1 | 12/2007 | Etelapera |
| 2008/0056466 A1 | 3/2008 | Nishimura |
| 2008/0076425 A1 | 3/2008 | Khetawat et al. |
| 2008/0114239 A1 | 5/2008 | Randall et al. |
| 2008/0123650 A1 | 5/2008 | Bhaskar |
| 2008/0144644 A1 | 6/2008 | Allan et al. |
| 2008/0161006 A1 | 7/2008 | Ferrato et al. |
| 2008/0270098 A1 | 10/2008 | Sarkkinen |
| 2008/0293402 A1 | 11/2008 | Rajan et al. |
| 2008/0299899 A1* | 12/2008 | Wolfe .................. H04B 1/3805 455/15 |
| 2009/0024845 A1 | 1/2009 | Benshetler et al. |
| 2009/0028059 A1 | 1/2009 | Barbaresi et al. |
| 2009/0052339 A1 | 2/2009 | Spring et al. |
| 2009/0112569 A1 | 4/2009 | Angus et al. |
| 2009/0140949 A1 | 6/2009 | Stratis et al. |
| 2009/0175209 A1* | 7/2009 | Roy ..................... H04W 92/02 370/312 |
| 2009/0185502 A1 | 7/2009 | Sung et al. |
| 2009/0254330 A1 | 10/2009 | Goria |
| 2009/0305709 A1 | 12/2009 | Panico et al. |
| 2010/0020735 A1 | 1/2010 | Roy et al. |
| 2010/0035619 A1 | 2/2010 | Panico et al. |
| 2010/0105399 A1 | 4/2010 | Akerlund |
| 2010/0141565 A1 | 6/2010 | Frandsen et al. |
| 2010/0144383 A1* | 6/2010 | Berger .................. G06Q 10/06 455/521 |
| 2010/0150122 A1* | 6/2010 | Berger .................. H04W 4/90 370/338 |
| 2010/0162036 A1 | 6/2010 | Linden et al. |
| 2010/0169446 A1 | 7/2010 | Linden et al. |
| 2010/0178925 A1 | 7/2010 | Bernini et al. |
| 2010/0227583 A1 | 9/2010 | Roy et al. |
| 2010/0232299 A1 | 9/2010 | Conway |
| 2010/0303033 A1 | 12/2010 | Shahar et al. |
| 2011/0034170 A1 | 2/2011 | Zhong et al. |
| 2012/0002588 A1* | 1/2012 | Roy ..................... H04W 24/08 370/315 |
| 2012/0033620 A1 | 2/2012 | Thoen et al. |
| 2012/0035904 A1 | 2/2012 | Seckendorf et al. |
| 2012/0039201 A1* | 2/2012 | Roy ..................... H04W 4/10 370/252 |
| 2012/0083307 A1 | 4/2012 | Roy et al. |
| 2012/0102097 A1 | 4/2012 | Jobe et al. |
| 2012/0331289 A1 | 12/2012 | Benshetler et al. |
| 2013/0072165 A1 | 3/2013 | Rondeau et al. |
| 2013/0114493 A1 | 5/2013 | Olivier et al. |
| 2013/0165134 A1 | 6/2013 | Touag et al. |
| 2013/0215819 A1 | 8/2013 | Ji et al. |
| 2013/0294323 A1 | 11/2013 | Roy et al. |
| 2013/0337822 A1 | 12/2013 | Rubin et al. |
| 2014/0195801 A1 | 7/2014 | Benshetler et al. |
| 2014/0273916 A1 | 9/2014 | Roy et al. |
| 2014/0357234 A1 | 12/2014 | Sullivan |
| 2014/0357285 A1 | 12/2014 | Smith et al. |
| 2015/0057040 A1 | 2/2015 | Kuehner |
| 2015/0271339 A1* | 9/2015 | Klein .................... H04M 3/543 455/417 |
| 2015/0281651 A1* | 10/2015 | Kaushik ................ H04N 5/7605 348/148 |
| 2015/0312772 A1* | 10/2015 | Agulnik .................. H04W 4/90 370/338 |
| 2015/0326471 A1 | 11/2015 | Anandan et al. |
| 2016/0014818 A1* | 1/2016 | Reitsma ................ H04W 76/50 370/254 |
| 2016/0036624 A1 | 2/2016 | Roy et al. |
| 2016/0073270 A1 | 3/2016 | Kobayashi |
| 2016/0100294 A1 | 4/2016 | Ruelke et al. |
| 2016/0112882 A1 | 4/2016 | Jobe et al. |
| 2016/0135207 A1 | 5/2016 | Bane et al. |
| 2016/0345192 A1* | 11/2016 | Garg ..................... H04W 24/04 |
| 2017/0230107 A1 | 8/2017 | Roy et al. |
| 2017/0311336 A1 | 10/2017 | Bane et al. |
| 2018/0054350 A1 | 2/2018 | Roy et al. |
| 2018/0295635 A1 | 10/2018 | Bane et al. |
| 2019/0069186 A1 | 2/2019 | Jobe et al. |
| 2019/0372662 A1 | 12/2019 | Roy et al. |

FOREIGN PATENT DOCUMENTS

| | | |
|---|---|---|
| DE | 10061550 A1 | 6/2002 |
| DE | 102007008196 A1 | 8/2008 |
| EP | 1 317 158 A1 | 6/2003 |
| EP | 1 335 617 A1 | 8/2003 |
| EP | 1 534 032 A1 | 5/2005 |
| EP | 1 534 033 A1 | 5/2005 |
| EP | 2 136 582 A1 | 12/2009 |
| GB | 2 427 796 A | 1/2007 |
| WO | WO-99/052314 A1 | 10/1999 |
| WO | WO-2005/006798 A1 | 1/2005 |
| WO | WO-2007/060808 A1 | 5/2007 |
| WO | WO-2007/078467 A2 | 7/2007 |
| WO | WO-2007/136270 A1 | 11/2007 |
| WO | WO-2008/014818 A1 | 2/2008 |
| WO | WO-2008/064706 A1 | 6/2008 |
| WO | WO-2008/151464 A1 | 12/2008 |
| WO | WO-2009/069507 A1 | 6/2009 |

OTHER PUBLICATIONS

Baker, D. et al., "The Design and Simulation of a Mobile Radio Network with Distributed Control," IEEE Journal on Selected Areas in Communications, Jan. 1984, pp. 226-237, vol. 2, Issue 1.

Chiani, M. et al., "A Semi-Analytical Approach for Performance Evaluation of TCP-IP Based Mobile Radio Links," Proceedings of Global Telecommunications Conference, 2000, pp. 937-942, vol. 2, IEEE, Piscataway, NJ.

Chrapkowski, A. et al., "Mobile Trunked Radio System Design and Simulation," 41st IEEE Vehicular Technology Conference, 1991, pp. 245-250, IEEE, New York, NY.

D'Aria, G. et al., "Simulation and Performance of the Pan-European Land Mobile Radio System," IEEE Transactions on Vehicular Technology, May 1992, pp. 177-189, vol. 41, Issue 2, IEEE.

Farrell, T.C., et al., "A Computer Simulation Analysis of Conventional and Trunked Land Mobile Radio for a System with a Small Number of User Groups," Military Communications Conference, Oct. 15-18, 1989, pp. 923-927, vol. 3.

Gladstone, K.J. et al., "Computer Simulation of Multipath Fading in the Land Mobile Radio Environment," Electronic Circuits and Systems, IEE Proceedings, Pt. G., Dec. 1980, pp. 323-330, vol. 127, Issue 6.

Harada, H. et al., "Simulation and Software Radio for Mobile Communications," book, 2002, pp. 335-364.

Liebl, G. et al., "A Real-Time Simulation Environment for IP-Traffic Over Cellular Links," 6th World Multiconference on Systemics, Cybernetics and Informatics Proceedings, 2002, pp. 1-6, vol. 4.

Liu, W. et al., "Parallel Simulation Environment for Mobile Wireless Networks," Proceedings of the 1996 Winter Simulation Conference, 1996, pp. 605-612, Coronado, CA.

(56) References Cited

OTHER PUBLICATIONS

Loo, C., "A Statistical Model for a Land Mobile Satellite Link," IEEE Transactions on Vehicular Technology, Aug. 1985, pp. 122-127, vol. 34, Issue 3, IEEE Vehicular Technology Society.

Nehme, G. et al., "A Simulation Study of High-Capacity Cellular Land-Mobile Radio-Communication Systems," Can. Elec. Eng. Journal, Jan. 1982, pp. 36-39, vol. 7, Issue 1, EIC, Canada.

Onoe, Y. et al., "Cooperation of Multiple Simulators for Mobile IP Networks," 17th International Conference on Advanced Information Networking and Applications, AINA 2003, pp. 367-372, IEEE, Piscataway, NJ.

Patzold, M. et al., "A Deterministic Digital Simulation Model for Suzuki Processes with Application to a Shadowed Rayleigh Land Mobile Radio Channel," IEEE Transactions on Vehicular Technology, May 1996, pp. 318-331, vol. 45, No. 2, IEEE.

Perennou, T. et al., "Two-Stage Wireless Network Emulation," Broadband Satellite Communication Systems and the Challenges of Mobility, 2005, pp. 181-190, vol. 169, IFIP International Federation for Information Processing.

Prasad, M.V. et al., "A Comparison of Land Mobile Radio Prediction Methods in Indian Rural Zones," IEEE International Conference on Personal Wireless Communications, 2005, pp. 217-219, IEEE.

Short, J. et al., "Mobile Wireless Network System Simulation," Wireless Networks, 1995, pp. 451-467, vol. 1, Issue 4, J.C. Baltzer AG, Science Publishers.

Simon, G. et al., "Simulation-based Optimization of Communication Protocols for Large-Scale Wireless Sensor Networks," 2003 IEEE Aerospace Conference Proceedings, 2003, pp. 1-8, IEEE.

Smith, J. I., "A Computer Generated Multipath Fading Simulation for Mobile Radio," IEEE Transactions on Vehicular Technology, Aug. 1975, pp. 39-40, vol. 24, Issue 3, IEEE.

Song, James, WARNSimulator, WayBack Machine, dated Jul. 1, 2007, 1 pg.

Telecommunications Industry Association (TIA) with Electronic Industries Alliance (EIA), TIA Standard: Project 25—Trunking Control Channel Messages, Addendum 2—Multiband Operations, New Technology Standards Project Digital Radio Technical Standards (ANSI/TIA-102.AABC-2), Dec. 2002, Telecommunications Industry Association (TIA), Arlington, VA (39 pages).

Telecommunications Industry Association (TIA) with Electronic Industries Alliance (EIA), TIA/EIA Standard: Project 25—Trunking Control Channel Messages New Technology Standards Project Digital Radio Technical Standards (ANSI/TIA/EIA-102.AABC), May 2000, Telecommunications Industry Association (TIA), Arlington, VA (150 pages).

Telecommunications Industry Association (TIA) with Electronic Industries Alliance (EIA), TIA/EIA Standard: Project 25—Trunking Control Channel Messages, Addendum 1, SNDCP Trunking Control Channel Messages (ANSI/TIA/EIA-102.AABC-1), Sep. 2001, Telecommunications Industry Association (TIA), Arlington, VA (11 pages).

Telecommunications Industry Association (TIA) with Electronic Industries Alliance (EIA), TIA/EIA Telecommunications Systems Bulletin, APCO Project 25—Trunking Overview (TSB102.AABA), Apr. 1995, Telecommunications Industry Association (TIA), Arlington, VA (12 pages).

Zeng, X. et al., "GloMoSim: A Library for Parallel Simulation of Large-scale Wireless Networks," Parallel and Distributed Simulation, 1998, pp. 154-161, Dept of Computer Science, Los Angeles, CA.

Zhi-Yong, S. et al., "Design and Simulation of Trunking Communication System in TD-SCDMA Network Based on SIP Protocol," 2009 International Symposium on Information Engineering and Electronic Commerce, May 2009, pp. 481-485, IEEE.

U.S. Appl. No. 60/950,868, filed Jul. 19, 2007; first-named inventor: Benshetler.

U.S. Appl. No. 60/950,870, filed Jul. 19, 2007; first-named inventor: Benshetler.

U.S. Appl. No. 60/963,131, filed Aug. 2, 2007; first-named inventor: Benshetler.

U.S. Appl. No. 61/790,588, filed Mar. 15, 2013; first-named inventor: Arindam Roy.

U.S. Appl. No. 62/076,473, filed Nov. 6, 2014; first-named inventor: Bane.

U.S. Appl. No. 14/979,007, Notice of Allowance, dated Jul. 3, 2018, 28 pgs.

Copending U.S. Appl. No. 15/494,391, filed Apr. 21, 2017; first-named inventor: Arindam Roy.

Office Action dated Jun. 5, 2017 in U.S. Appl. No. 15/494,391.

U.S. Appl. No. 15/494,391, Final Office Action dated Dec. 22, 2017, 23 pgs.

U.S. Appl. No. 15/494,391, Non-Final Office Action dated Jul. 26, 2018, 12 pgs.

U.S. Appl. No. 15/494,391, Final Office Action, dated Feb. 11, 2019, 12 pgs.

U.S. Appl. No. 15/494,391, Notice of Allowance dated Apr. 10, 2019, 8 pgs.

Copending U.S. Appl. No. 16/010,107, filed Jun. 15, 2018, first-named inventor Ronald Lee Bane.

Copending U.S. Appl. No. 16/171,177, filed Oct. 25, 2018, first-named inventor Marshall Jobe.

U.S. Appl. No. 14/979,007, Notice of Allowance, dated Jul. 25, 2018, 22 pgs.

U.S. Appl. No. 15/786,476, Corrected Notice of Allowance dated Nov. 1, 2018, 7 pgs.

U.S. Appl. No. 15/786,476, Notice of Allowance dated Oct. 1, 2018, 11 pgs.

U.S. Appl. No. 16/171,177, Notice of Allowance dated Sep. 26, 2019, 21 pgs.

U.S. Appl. No. 16/543,302, Non-Final Office Action dated Dec. 9, 2019, 14 pgs.

U.S. Appl. No. 15/494,391, filed Apr. 21, 2017, Distributed Simulcast Architecture.

U.S. Appl. No. 16/010,107, filed Jun. 15, 2018, System and Method for Dynamic Channel Allocation.

U.S. Appl. No. 16/171,177, filed Oct. 25, 2018, System and Method for Simulating a Land Mobile Radio System.

U.S. Appl. No. 16/543,302, filed Aug. 16, 2019, Distributed Simulcast Architecture.

U.S. Appl. No. 16/543,302, Final Office Action dated May 4, 2020, 8 pgs.

U.S. Appl. No. 16/010,107, Non-Final Office Action dated Mar. 6, 2020, 14 pgs.

* cited by examiner

INTEROPERABILITY GATEWAY FOR LAND MOBILE RADIO SYSTEM

CROSS-REFERENCE TO RELATED APPLICATIONS

This application is a continuation of and claims the benefit of U.S. patent application Ser. No. 15/786,476, entitled "Interoperability Gateway for Land Mobile Radio System," filed Oct. 17, 2017, and naming Arindam Roy, Brandon Hudson Yarbrough, Jon Bartosch, and Steven Newman as inventors, which is a continuation of and claims the benefit of, U.S. Pat. No. 9,800,460, entitled "Interoperability Gateway for Land Mobile Radio System," filed Jul. 31, 2015, and naming Arindam Roy, Brandon Hudson Yarbrough, Jon Bartosch, and Steven Newman as inventors, which is a non-provisional of and claims priority to U.S. Provisional Patent Application Ser. No. 62/032,376, entitled "Interoperability Gateway for Land Mobile Radio System," filed Aug. 1, 2014, and naming Arindam Roy, Brandon Hudson Yarbrough, Jon Bartosch, and Steven Newman as inventors, the disclosures of which are incorporated herein by reference in their entirety.

FIELD

The present disclosure relates generally to Land Mobile Radio (LMR) communication systems. More specifically, but not by way of limitation, the present disclosure relates to a system for providing backup connection between a dispatch center and an LMR system in the event the dispatch center is disconnected from the LMR system.

BACKGROUND

The statements in this section merely provide background information related to the present disclosure and may not constitute prior art.

Land Mobile Radio (LMR) systems are deployed by organizations requiring instant communication between geographically dispersed and mobile personnel. Current LMR systems can be configured to provide for radio communications between one or more sites and subscriber radio units in the field. A subscriber radio unit (hereinafter "radio") may be a mobile unit or a portable unit. LMR systems can be as simple as two radio units communicating between themselves over preset channels, or they can be complex systems that include hundreds of radio units and multiple sites. Typical users of LMR systems include police departments, fire departments, medical personnel, security personnel, EMS, and the military.

LMR systems are usually connected to a dispatch center, which provides functionality for call routing and interoperability between various systems and devices. FIG. 1 illustrates an example embodiment of a dispatch center 110 deployed in an LMR system, wherein the dispatch center 110 hosts multiple consoles 115, a gateway 120, and control station 125. The dispatch center 110 maintains a wired connection 130 to an LMR system 100 comprising one or more LMR sites 135. Radios 140 communicate at the LMR site 135 over radio frequency (RF) connections 145, and calls are passed to the consoles 115 over the wired connection 130 between the LMR system 100 and dispatch center 110.

If the wired connection 130 is lost, the radio calls are not received by the consoles 115. Therefore, as backup, a gateway 120 is deployed in the dispatch center 110, wherein the gateway 120 is connected to a radio or control station 125 that is capable of communicating on the system 100 with a particular TalkGroup. A dispatcher, upon recognizing being disconnected from the system 100, instructs the control station 125 to operate on a particular TalkGroup. The control station 125, through the gateway 120, provides the dispatcher a wireless connection 150 to users of the particular TalkGroup. As such, the dispatcher has access to the LMR system 100 via a wireless connection 150 for only the particular TalkGroup provided by the gateway 120 and control station 125.

The gateway 120 and control station 125 are capable of providing a dispatcher access to only one TalkGroup. Thus, to provide access to the LMR system 100 for each TalkGroup supported by the system 100, an additional gateway 120 and control station 125 is needed to support each additional TalkGroup, thereby substantially increasing operation and equipment costs. For example, to support each TalkGroup for a system having twelve channels and 100 TalkGroups, the dispatch center would require deployment of 100 gateways and 100 control stations to provide full backup console functionality. Furthermore, each gateway/control station combination is configured as a separate TalkGroup on the dispatch console 115 to distinguish them from active TalkGroups maintained between the consoles 115 and system 100, thereby increasing complexity and occupying valuable screen space on the dispatcher's console 115.

SUMMARY

The present disclosure provides an interoperability gateway system and method for providing seamless backup connection between a dispatch center and an LMR system.

In one embodiment the present disclosure provides a gateway system for providing backup connection between a dispatch center and a Land Mobile Radio (LMR) system when the dispatch center is disconnected from the LMR system, the gateway system comprising: a controller configured to detect the disconnection between the dispatch center and the LMR system; a plurality of control stations coupled to the controller via an IP network, wherein each of the control stations are configured to establish a communication link between the dispatch center and the disconnected LMR system; wherein the controller is further configured to, in response to detecting the disconnection, allocate a first one of the plurality of control stations as a control channel for the disconnected LMR system, and allocate a second one of the plurality of control stations as a voice channel for communicating with the disconnected LMR system over the voice channel.

In another embodiment, the present disclosure provides a system for providing backup connection between a dispatch center and a Land Mobile Radio (LMR) system when the dispatch center is disconnected from the LMR system, the system comprising: a controller configured to detect the disconnection between the dispatch center and the LMR system; two or more control stations coupled to the controller via an IP network, wherein at least one of the two or more control stations is configured to establish a communication link between the dispatch center and the disconnected LMR system; wherein the controller is further configured to, in response to detecting the disconnection, allocate a first one of the two or more control stations as a control channel for the disconnected LMR system, and allocate a second one of the two or more control stations as a voice channel for communicating with the disconnected LMR system over the voice channel.

In yet another embodiment, the present disclosure provides a method for providing backup connection between a dispatch center and a Land Mobile Radio (LMR) system when the dispatch center is disconnected from the LMR system, the method comprising: detecting, via a controller, the disconnection between the dispatch center and the LMR system; establishing, via at least one of a plurality of control stations, a communication link between the dispatch center and the disconnected LMR system; and allocating, via the controller in response to detecting the disconnection, a first one of the plurality of control stations as a control channel for the disconnected LMR system, and a second one of the plurality of control stations as a voice channel for communicating with the disconnected LMR system over the voice channel.

Further embodiments and apparatuses, including other areas of applicability, will become apparent from the description provided herein. It should be understood that the description and specific examples are intended for purposes of illustration only and are not intended to limit the scope of the present disclosure in any manner.

BRIEF DESCRIPTION OF THE DRAWINGS

For a more complete understanding of various embodiments of the present disclosure and the advantages thereof, reference is now made to the following brief description, taken in connection with the accompanying drawings and detailed description, wherein like reference numerals represent like parts, and in which.

DETAILED DESCRIPTION

Figure 1:
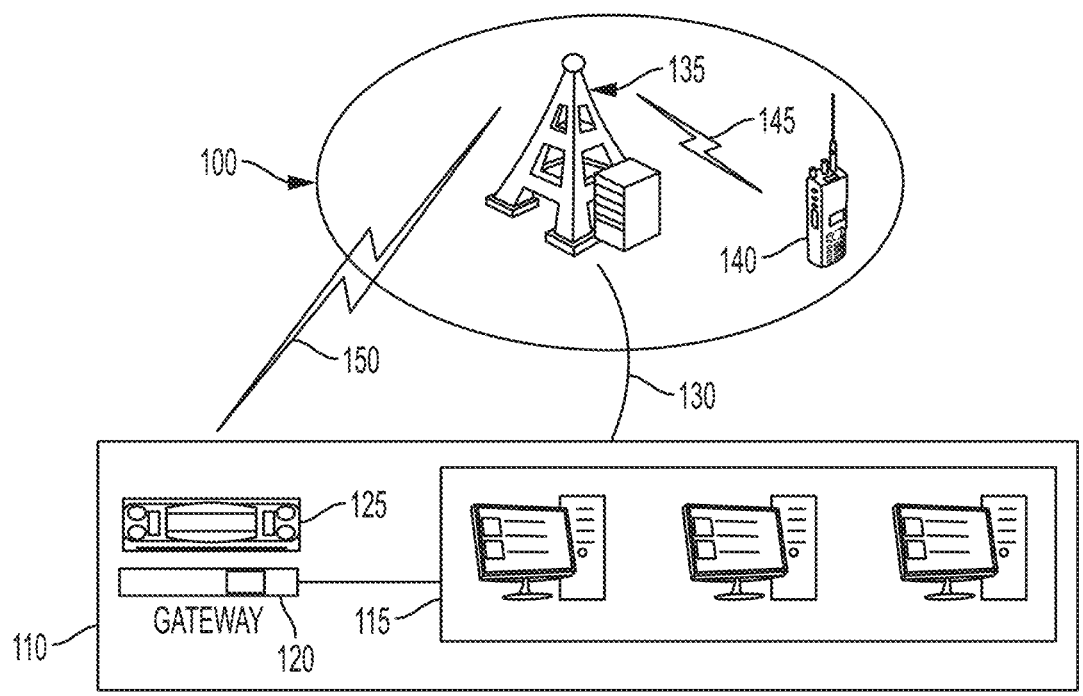
FIG. 1 illustrates an example embodiment of a dispatch center deployed in an LMR system.

In the following detailed description and the attached drawings, numerous specific details are set forth to provide a thorough understanding of the present disclosure. However, those skilled in the art will appreciate that the present disclosure may be practiced, in some instances, without such specific details. In other instances, well-known elements have been illustrated in schematic or block diagram form in order not to obscure the present disclosure in unnecessary detail. Additionally, for the most part, specific details, and the like, have been omitted inasmuch as such details are not considered necessary to obtain a complete understanding of the present disclosure, and are considered to be within the understanding of persons of ordinary skill in the relevant art.

It is further noted that, unless indicated otherwise, all functions described herein may be performed in hardware or as software instructions for enabling a computer, radio or other device to perform predetermined operations, where the software instructions are embodied on a computer readable storage medium, such as RAM, a hard drive, flash memory or other type of computer readable storage medium known to a person of ordinary skill in the art. In certain embodiments, the predetermined operations of the computer, radio or other device are performed by a processor such as a computer or an electronic data processor in accordance with code such as computer program code, software, firmware, and, in some embodiments, integrated circuitry that is coded to perform such functions. Furthermore, it should be understood that various operations described herein as being performed by a user may be operations manually performed by the user, or may be automated processes performed either with or without instruction provided by the user.

The present disclosure provides an interoperability gateway system and method capable of providing functionality for communicating between LMR systems. For example, the interoperability gateway may convert a voice type or call type from one LMR system to a voice type or call type suitable for another LMR system, wherein the LMR systems may be of same types or different types. Examples of such LMR system types may include E F Johnson's ATLAS® P25 system, other P25 systems, conventional LMR systems, trunking LMR systems, hybrid LMR systems, wide area systems such as simulcast LMR systems and multicast LMR systems, and other LMR systems.

In some embodiments, the interoperability gateway system and method provides backup dispatch console functionality between a dispatch center and an LMR system in the event the dispatch center is disconnected from the LMR system. In general, this may be accomplished by providing an RF link between the disconnected site and the interoperability gateway via a controller, or interoperability site network interface (ISNI), that is activated when the dispatch center is disconnected from the LMR system. As discussed in greater detail below, the interoperability gateway provides the backup connection by allocating a control station for each channel (rather than for each TalkGroup) available at the disconnected LMR system. When compared to conventional dispatch console backup schemes, the disclosed interoperability gateway system and method greatly reduces the equipment needed to provide dispatch console backup, thereby decreasing equipment and operation costs, and simplifying operation by providing a solution that is virtually transparent to the dispatcher.

Figure 2:
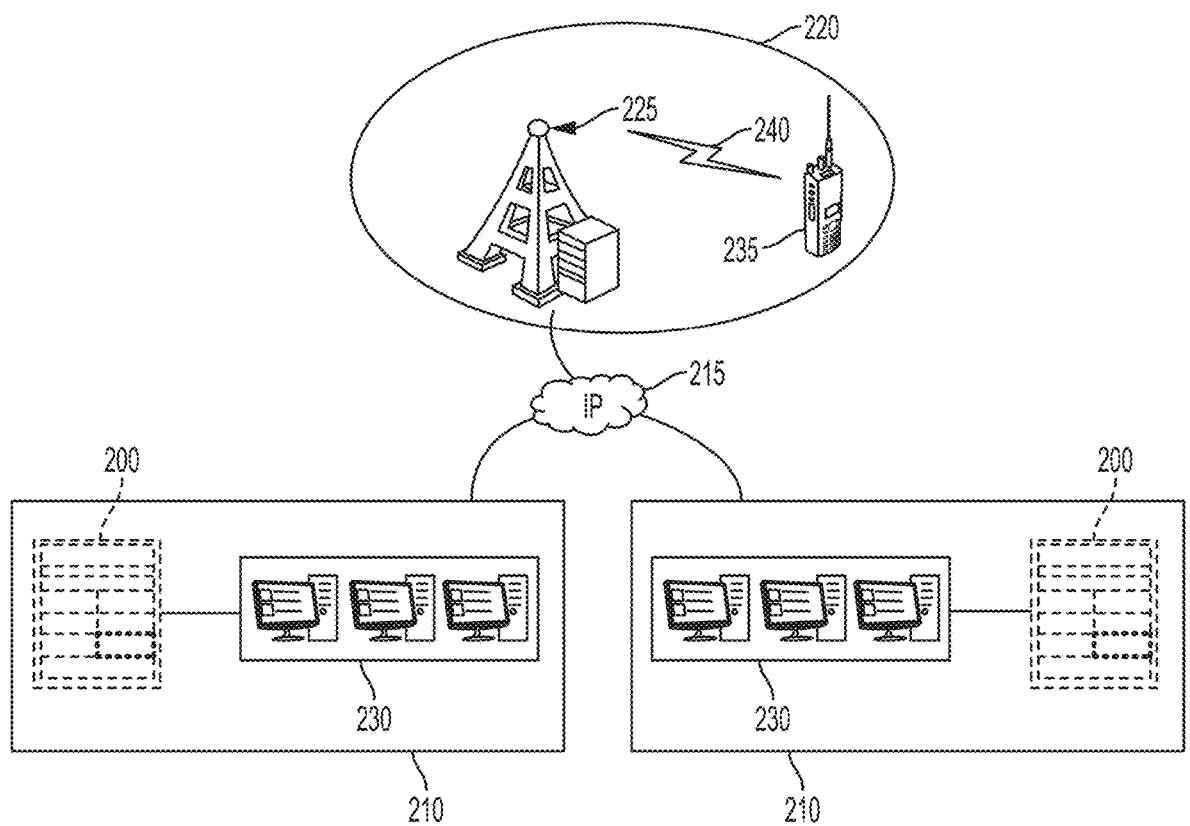
FIG. 2 illustrates an example embodiment wherein the disclosed interoperability gateway is hosted at various dispatch centers connected via an IP network to an LMR system having one or more LMR sites.

FIG. 2 illustrates an example embodiment wherein the disclosed interoperability gateway 200 is hosted at various dispatch centers 210 connected via an Internet Protocol (IP) network 215 to an LMR system 220 having one or more LMR sites 225. The dispatch centers 210 maintain a wired connection to the LMR system 220 through the IP network 215. Radios 235 communicate at the LMR site 225 over RF connections 240, and calls are passed to the dispatch centers 210 over the IP network 215.

Each dispatch center 210 further includes one or more dispatch consoles 230, which are connected to the local interoperability gateway 200. Dispatchers conduct call operations from the consoles 230, which include organizing calls using the TalkGroups assigned to users of the LMR system 220. Specifically, the dispatchers originate or receive calls on particular TalkGroups configured on the dispatch console 230 and via the IP network 215. The calls on the Talkgroups are placed on the LMR system 220 through an assignment of an RF channel to communicate with the LMR site 225 over RF connection 240. While the dispatchers may communicate on hundreds of TalkGroups, one call can be placed through a channel at a time, thereby limiting the number of simultaneous calls that can be placed on LMR system 220.

In the configuration illustrated in FIG. 2, the LMR system 220 is fully operational and the dispatch centers 210 are connected to the system 220 via the IP network 215. As such, the interoperability gateway 200 is inactive because it is not transmitting or processing any calls. However, although inactive, the interoperability gateway 200 may still receive calls transmitted from the system 220 through both control stations and a wired connection through the IP network 215.

Figure 3:
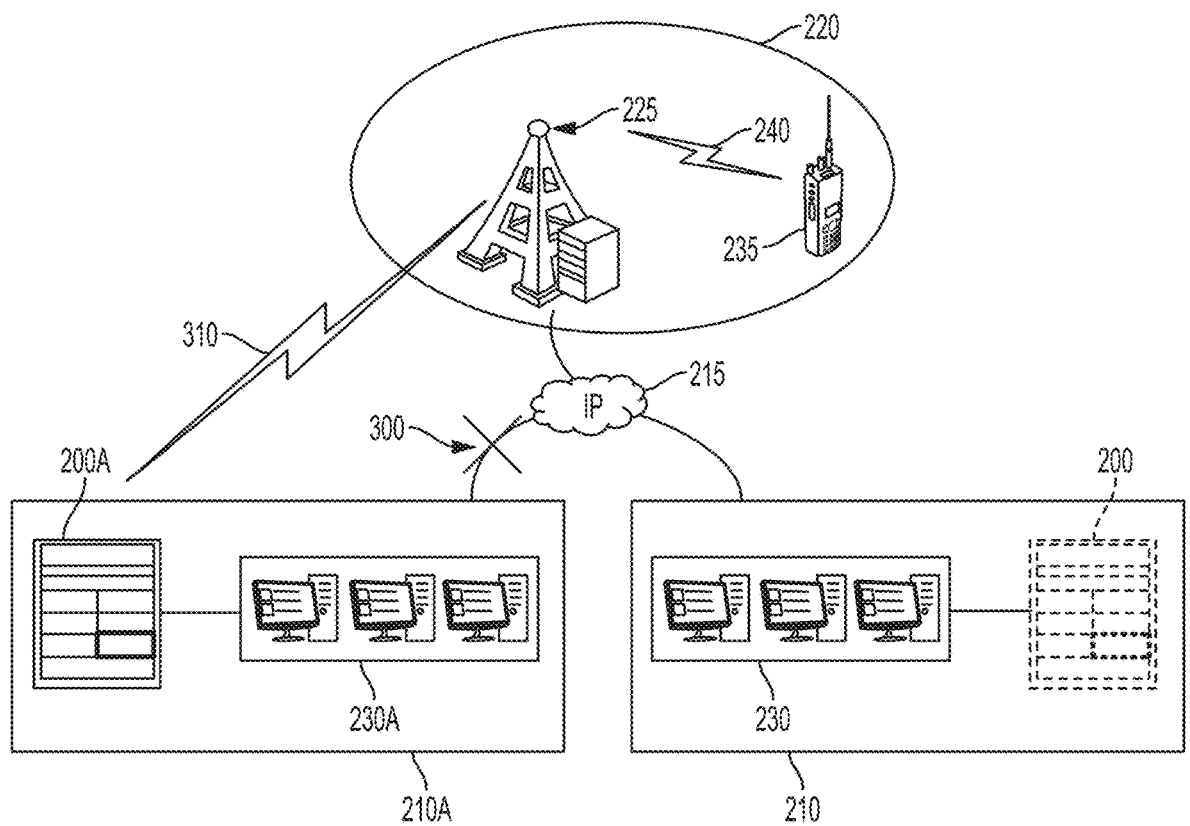
FIG. 3 illustrates the example embodiment shown in FIG. 2, wherein one of the dispatch centers is disconnected from the LMR system.

Referring now to FIG. 3, when a connection failure 300 occurs between a dispatch center 210A and the LMR system 220, the interoperability gateway 200A at the disconnected dispatch center 210A detects the disconnection and becomes active to establish an RF connection 310 between the disconnected dispatch center 210A and the LMR system 220. At this point, the dispatchers operating the consoles 230A cannot access the LMR system 220 through the wired IP network connection 215. Nevertheless, the dispatchers are able to reuse the same TalkGroups present on their console 230A at the time the connection failed, to seamlessly transition to communication with the LMR system 220 through the interoperability gateway 200A. Activation of the interoperability gateway 200A is automatic, and the dispatchers continue to use their TalkGroup resources that they were using during the wired connection through IP network 215. As such, the switching from the wired connection to the wireless connection provided by the interoperability gateway 200A occurs seamlessly without dispatcher intervention or interruption.

As explained in greater detail below, any calls originated from the LMR system 220 are received by the interoperability gateway 200A via the RF connection 310, and are passed to the consoles 230A at the dispatch center 210A. Conversely, any calls that originate from the dispatch center 210A are sent via the interoperability gateway 200A over the RF connection 310 to be placed on the LMR system 220. Thus, the interoperability gateway 200A provides a virtually transparent solution, because it facilitates the continued communication with the LMR system 220 via the TalkGroups displayed on the consoles 230A with little or no interruption to the dispatcher.

It should be appreciated that, in some embodiments, the equipment comprising the interoperability gateway 200 may not be housed entirely, or in part, at the dispatch center 210, but may instead be separated and disposed at locations in the LMR system that are separate and apart from the dispatch console 210. It should also be appreciated that, in some embodiments, the interoperability gateway 200 may incorporate a distributed LMR architecture, such as that disclosed in U.S. patent application Ser. No. 14/217,150, entitled "Distributed Simulcast Architecture" and incorporated herein by reference for all purposes, wherein the interoperability gateway 200 operates as an LMR site 225 in the LMR system 220.

Figure 4:
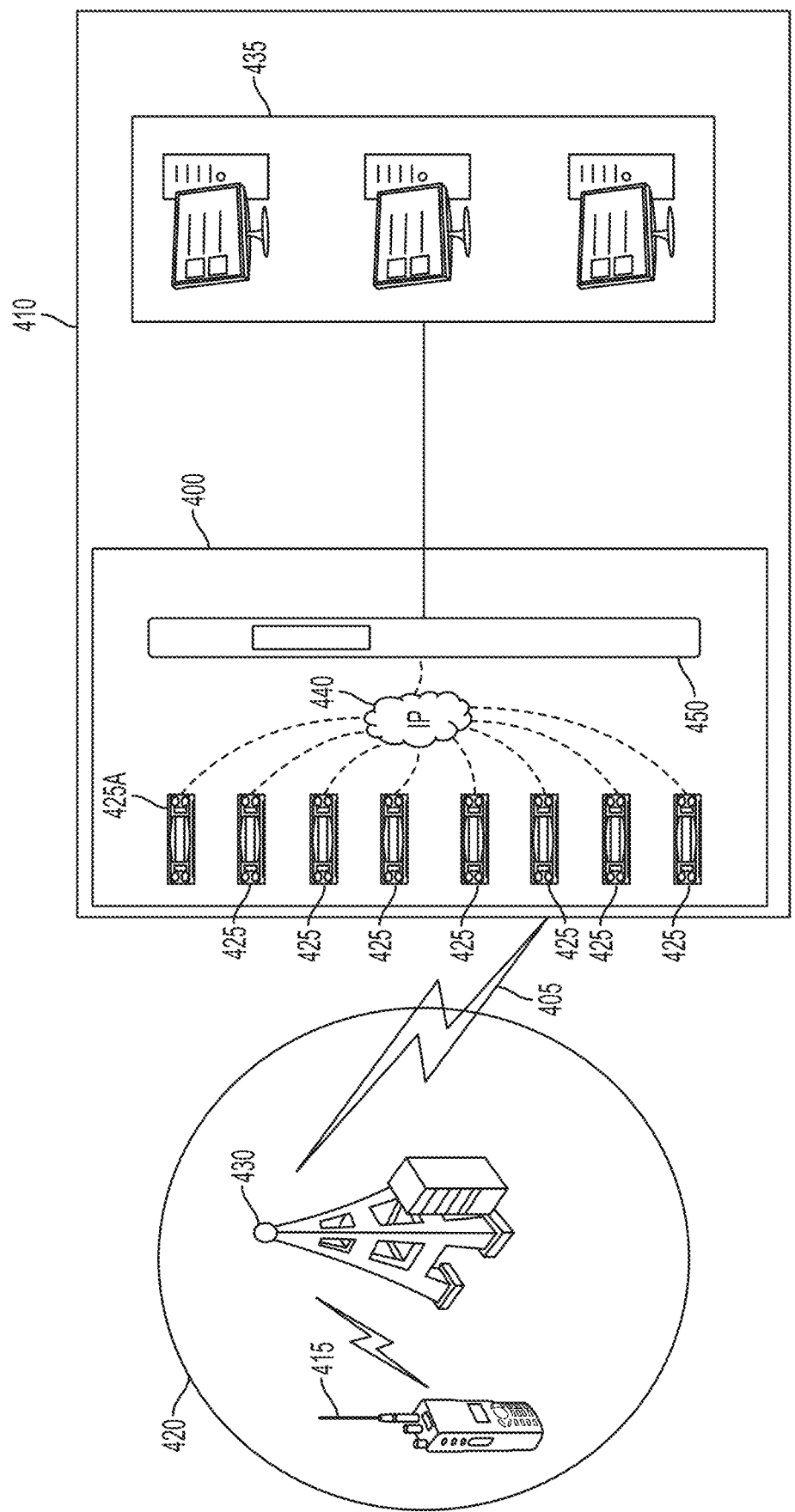
FIG. 4 illustrates an example embodiment wherein the interoperability gateway is implemented in the backup console mode of operation to provide a connection between a dispatch center and an LMR system when the dispatch center loses its wired connection to the LMR system.

Operation of the disclosed interoperability gateway backup console functionality is now described with reference to FIG. 4. FIG. 4 illustrates an example embodiment wherein the interoperability gateway 400 is implemented in the backup console mode of operation to provide a connection 405 between a dispatch center 410 and an LMR system 420 (also referred to herein as the "connected LMR system") when the dispatch center 410 loses its wired connection to the LMR system 420. In some embodiments, the interoperability gateway 400 may include a router to provide IP connectivity, one or more gateway controllers 450 to provide call control, a set of control stations 425 to provide RF connection to the LMR system 420, and one or more power supplies to provide power. In some embodiments, the interoperability gateway 400 may include additional control stations 425 and/or controllers 450 to provide redundancy in case of equipment failure.

In the example embodiment illustrated in FIG. 4, the LMR system 420 is a twelve-channel simulcast LMR system capable of supporting hundreds of TalkGroups while utilizing one control channel and up to eleven voice channels at a given moment to service radios 415 communicating with one or more LMR sites 430. Accordingly, the interoperability gateway 400 is configured to mirror the functionality of the LMR system 420 by utilizing up to twelve control stations 425, each designated to mirror one of the channels (control or voice) supported by the simulcast LMR system 420. In some embodiments, one control station 425 monitors a control channel supported by the LMR system 420, while each of the remaining control stations 425 are dedicated to one of the voice channels. For example, as shown in FIG. 4, control station 425A may be dedicated as the control channel, and each of the remaining control stations 425 are dedicated to one of the voice channels. In some embodiments, all control stations 425 may monitor the control channel, and the assignment of a control station 425 to an RF channel may be directed via the gateway controller 450.

The interoperability gateway 400 includes an interoperability site network interface (ISNI) 450 (also referred to herein as controller or gateway controller) that is connected to the control stations 425 over an IP network 440. The controller 450 controls operation of the interoperability gateway 400 by performing various functions including, but not limited to, monitoring the wired connection between the dispatch center 410 and LMR system 420, automatically activating the interoperability gateway 400 when the dispatch center 410 is disconnected from the LMR system 420, processing calls placed on and received via the control stations 425, managing connectivity of the control stations 425, and providing an interface between the interoperability gateway 400 and the consoles 435 in the dispatch center 410. In some embodiments, operation of the interoperability gateway 400 also includes deactivating the interoperability gateway 400 in the event the dispatch center 410 is reconnected with the LMR system 420 via the wired connection.

Upon failure of the wired connection between the dispatch center 410 and the LMR system 420, the controller 450 activates the interoperability gateway 400 and utilizes the control stations 425 to establish an RF connection 405 between the dispatch center 410 and the LMR system 420. When a call is originated from the LMR system 420 on a voice channel, the call is received by the corresponding control station 425, which forwards the call over the IP network 440 to the controller 450, which then passes the call to the console 435. When a call is originated from a console 435, the call is received by the controller 450, and the call is placed on the LMR system 420 using a transmit control station 425. The transmit control station 425 is a control station 425 that is assigned a voice channel and is configured to the voice channel to transmit the call to the LMR system 420. In some embodiments, the control station 425 previously assigned to the voice channel of the LMR system 420 is then reconfigured to become the transmit control station 425 to accommodate a call from the console 435 on that same voice channel.

As discussed above, the interoperability gateway 400 provides the backup console functionality by allocating a control station 425 for each channel available at the disconnected LMR system 420, rather than allocating a control station for each TalkGroup. When compared to conventional dispatch console backup schemes, which allocate control stations for each TalkGroup, the disclosed interoperability gateway system greatly reduces the equipment needed to provide dispatch console backup, thereby decreasing equipment and operation costs, and simplifying operation by providing a solution that is virtually transparent to the dispatcher.

Figure 5:
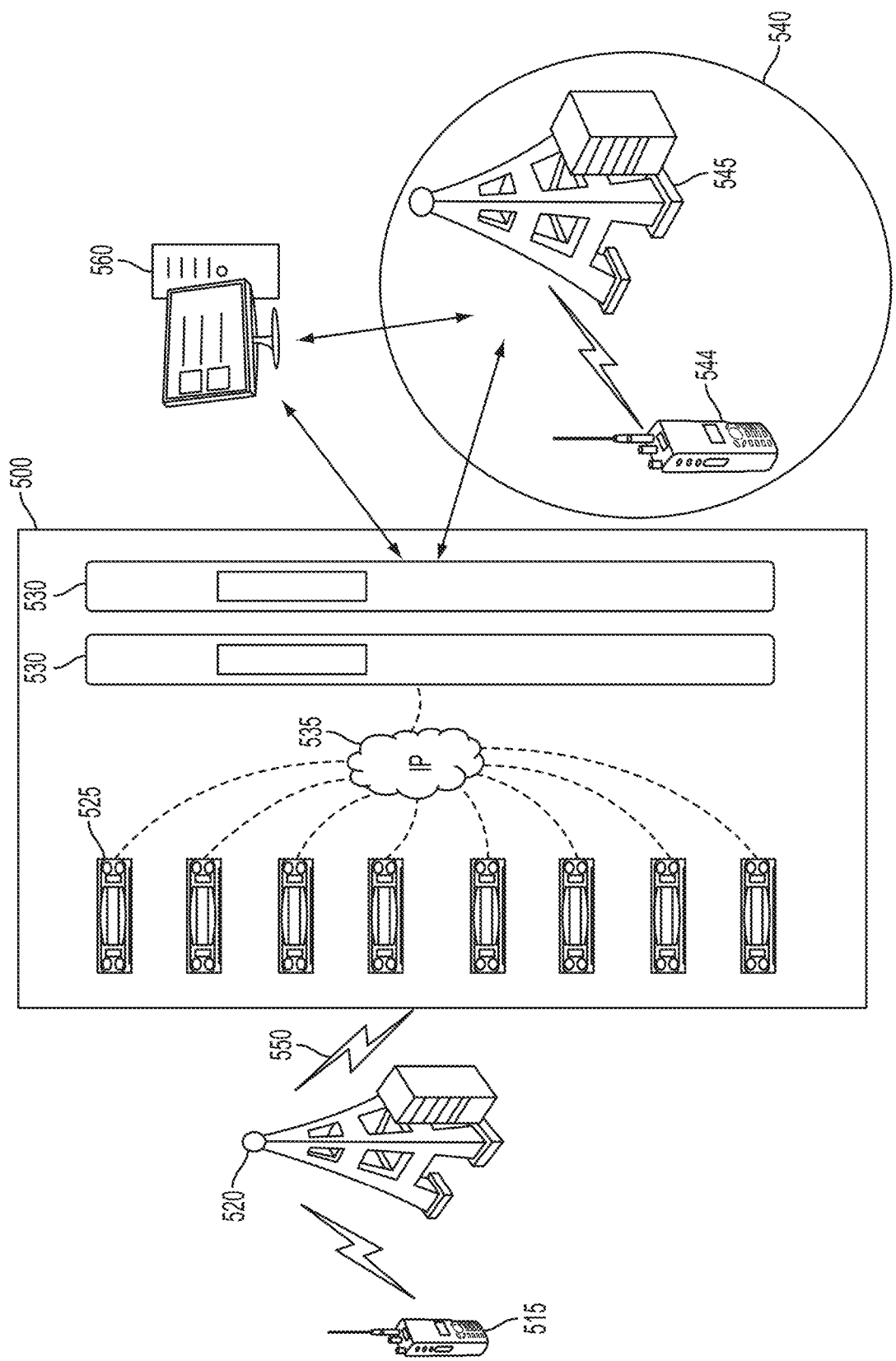
FIG. 5 illustrates an example embodiment wherein the interoperability gateway is implemented to provide interoperability between a trunking LMR system and a P25 console system.
Figure 6:
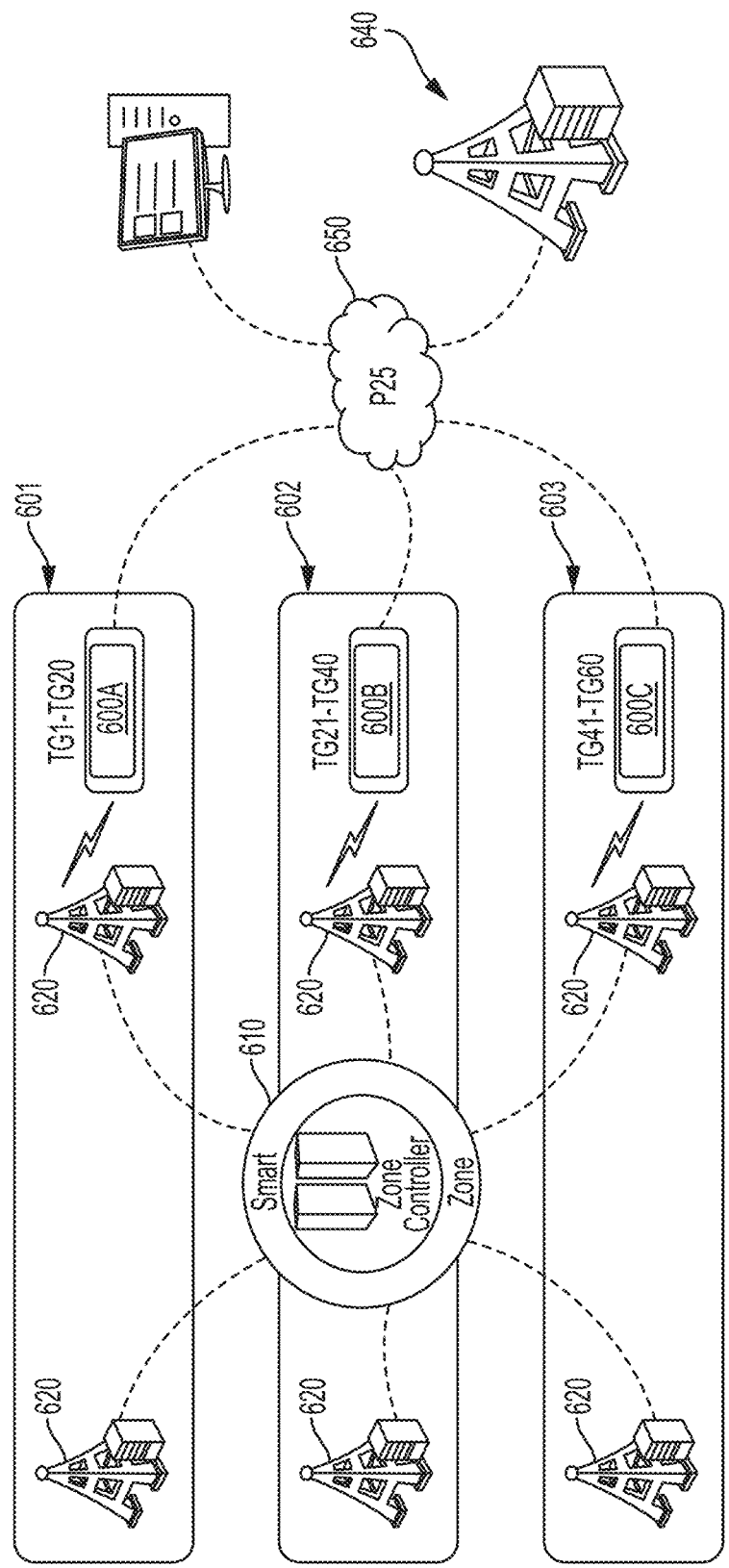
FIG. 6 illustrates an example embodiment wherein the interoperability gateway is implemented to provide interoperability between a trunking LMR system and a P25 LMR system.

In some embodiments, the disclosed interoperability gateway is capable of providing functionality for communicating between different LMR systems. For example, the interoperability gateway may convert a voice type or call type from one LMR system to a voice type or call type suitable for a different LMR system. FIGS. 5 and 6 illustrate example embodiments of various implementations of the disclosed interoperability gateway to provide communication between various LMR systems.

FIG. 5 illustrates an example embodiment wherein the interoperability gateway 500 is implemented to provide interoperability between a single trunking LMR site 520 and a P25 LMR system 540. The interoperability gateway 500 includes control stations 525 connected to one or more controllers 530 via an IP network 535. The single trunking LMR site 520 is an eight-channel trunking LMR system 520 capable of supporting many TalkGroups while utilizing one control channel and up to seven voice channels at a given moment to service radios 515 communicating with the trunking LMR site 520. The P25 LMR system 540 may include one or more LMR sites 545 providing communication between one or more radios 544. In the embodiment illustrated in FIG. 5, an additional controller 530 is implemented to provide redundancy.

The interoperability gateway 500 is configured to mirror the functionality of the trunking LMR site 520 by utilizing up to eight control stations 525, each designed to mirror one of the channels supported by the trunking LMR site 520. In some embodiments, one control station 525 monitors a control channel supported by the trunking LMR site 520, while each of the remaining control stations 525 are dedicated to one of the voice channels. In some embodiments, the control stations 525 may be dynamically assigned to a channel by the controller 530. Accordingly, the interoperability gateway 500 mirrors the trunking LMR site 520 by allocating a control station 525 to each of the channels supported by the trunking LMR site 520.

The interoperability gateway 500 provides interoperability between the trunking LMR site 520 and the P25 LMR system 540 by processing calls between the trunking LMR site 520 and the P25 LMR system 540. The interoperability gateway 500 establishes an RF connection 550 between the trunking LMR site 520 and the interoperability gateway 500. When a call is originated from the trunking LMR site 520 on a voice channel, the call is received by the corresponding control station 525, which forwards the call over the IP network 535 to the controller 530, which converts the call to P25 protocol and connects the call with the P25 LMR system 540. In some embodiments, the call may be sent from the controller 530 to the console 560, and then directed to the P25 LMR system 540. When a call is originated from the P25 LMR system 540, the call is received by the controller 530, and the call is placed on the trunking LMR site 520 using a transmit control station 525. The transmit control station 525 is assigned a voice channel and is configured to the voice channel to transmit the P25 call to the trunking LMR site 520. In some embodiments, the previously assigned control station 525 for the voice channel is then reconfigured to become the transmit control station 525.

FIG. 6 illustrates an example embodiment wherein one or more interoperability gateways 600 are implemented to provide interoperability between a plurality of trunking LMR sites 620 and a P25 LMR system 640, wherein the trunking LMR sites 620 are connected through a controller 610 in a multicast configuration. In the embodiment illustrated in FIG. 6, a call can be setup on a particular site 620, or it can be placed as a wide area call spanning multiple sites 620. Additionally, TalkGroups may be restricted or zoned to particular sites 620 based on system settings. For example, in the embodiment illustrated in FIG. 6, a first group 601 of sites 620 communicate using a first subset of TalkGroups, a second group 602 of sites 620 communicate using a second subset of TalkGroups, and a third group 603 of sites 620 communicate using a third subset of TalkGroups.

In the embodiment illustrated in FIG. 6, the interoperability gateways 600 connect the plurality of LMR sites 620 to the P25 LMR system 640 via IP network 650. Specifically, each interoperability gateway 600 provides interoperability between a particular group of TalkGroups via the sites 620 and the P25 LMR system 640. For example, interoperability between each of the sites 620 in the first group 601 and the P25 LMR system 640 is provided by a first interoperability gateway 600A. Similarly, interoperability between each of the sites 620 in the second group 602 and the P25 LMR system 640 is provided by a second interoperability gateway 600B, and interoperability between each of the sites 620 in the third group 603 and the P25 LMR system 640 is provided by a third interoperability gateway 600C. Each of the interoperability gateways 600 provide interoperability on the subset of TalkGroups assigned to the interoperability gateway's respective group of sites 620, and each of the interoperability gateways 600 connects via an RF link to a particular LMR site 620 within the respective gateway's group of sites 620.

In the example embodiment illustrated in FIG. 6, each gateway 600 is mapped to the channels of a particular group of sites 620. However, by restricting each gateway 600 to provide communication on a set of channels, the channel resources used for a set of TalkGroups can be reduced. Calls that are not required or intended for one group of sites 620 is not placed on the interoperability gateway 600 corresponding to the unintended group of sites 620. Thus, the channel resources for the unintended group of sites 620 are not utilized and remain available.

In the embodiment illustrated in FIG. 6, each interoperability gateway 600 is flexible and can be strategically located at multiple sites within the multicast system based on certain data such as existing fleet map and user activities. In some embodiments, a dummy LMR site may be created to serve as a gateway site to link all TalkGroups within the multicast system through an interoperability gateway 600.

Because the interoperability gateway 600 is located on the dummy site, there is no need for additional RF equipment, such as an antenna system, to allow the dummy site to connect to the interoperability gateway 600. The interoperability gateway control stations can access the dummy site over an RF connection in a local environment without the need for expensive antenna, Multicoupler, and combiner equipment.

Figure 7:
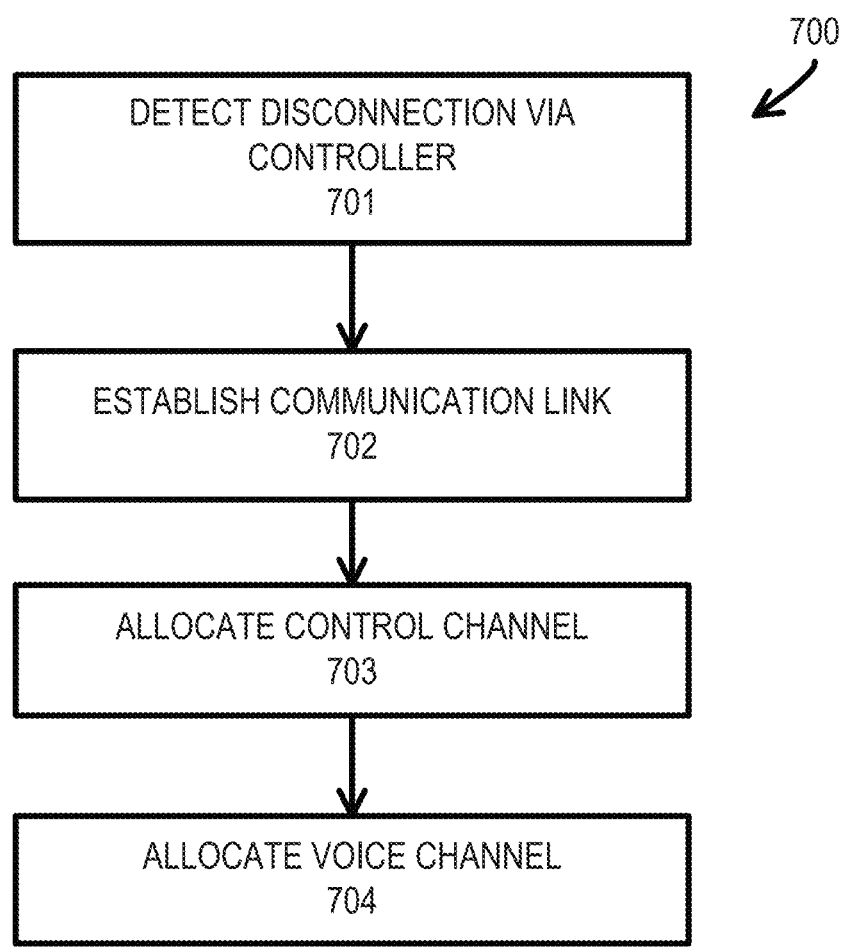
FIG. 7 illustrates an example flow diagram of a method for providing backup connection between a dispatch center and a Land Mobile Radio (LMR) system when the dispatch center is disconnected from the LMR system.

Referring now to FIG. 7, an example flow diagram 700 is provided illustrating a method in accordance with the disclosed system for providing backup connection between a dispatch center and a Land Mobile Radio (LMR) system when the dispatch center is disconnected from the LMR system. At block 701, a controller detects the disconnection between the dispatch center and the LMR system. At block 702, a communication link between the dispatch center and the disconnected LMR system is established by one or more of the control stations. At block 703, the controller allocates a first one of the control stations as a control channel for the disconnected LMR system in response to detecting the disconnection between the dispatch center and the LMR system. At block 704, the controller allocates a second one of the control stations as a voice channel for communicating with the disconnected LMR system over the voice channel.

In accordance with one or more embodiments, the disclosed interoperability gateway may support a unique set of TalkGroups (interoperability TalkGroups). Thus, a call on a TalkGroup may not be attempted through multiple LMR sites or through multiple controllers.

In some embodiments, TalkGroup IDs may be maintained across LMR systems connected by the disclosed interoperability gateway. Each interoperability TalkGroup ID on a connected LMR system may be mapped to a corresponding P25 TalkGroup ID on the P25 LMR system. This allows users to maintain their existing TalkGroup ID on the connected LMR system while creating new TalkGroups on the P25 system, thereby allowing mapping a connected LMR system TalkGroup to the same ID on the P25 TalkGroup.

Dynamic user IDs may be configured, in some embodiments, to indicate if the user is a radio user or a dispatcher. In some embodiments, when a call is placed originating from the P25 LMR system, the P25 LMR system user ID may be used even though the call may be placed through the control station. Conversely, when a call is placed originating from a connected LMR system, the user ID from the connected LMR system may be used. In some embodiments, when a console originated call is placed on the P25 LMR system, the interoperability gateway may place the call on the P25 LMR system as a console originated call to enable console preemption and parallel console functionality.

In some embodiments, the interoperability gateway may allow using a fixed user ID to place calls between a P25 LMR system and a connected LMR system. In such embodiments, when a P25 originated call is placed on the connected LMR system, the call is placed through the control station and the user ID of the control station or a dummy user ID is used. When a call is originated from the connected LMR system and placed on the P25 LMR system, a dummy P25 user ID may be used. A fixed user configuration may be useful, for example, when it is not possible to enter the P25 user IDs into the connected LMR system.

In some embodiments, each interoperability P25 TalkGroup configured in the interoperability gateway can be configured as confirmed or unconfirmed. If the TalkGroup is configured as confirmed, then, for calls originated from the connected LMR system, the interoperability gateway will wait for a successful response from all interested P25 sites before setting up the call. If the TalkGroup is configured as unconfirmed, then, for calls originated from the connected LMR system, the interoperability gateway will not wait for successful responses from all interested P25 sites before setting up the call.

In some embodiments, if the interoperability gateway receives a call originated from the connected LMR system, and identifies the corresponding TalkGroup as an unconfirmed TalkGroup, the interoperability gateway sends a proceed message to all interested P25 sites, and sends the voice stream without waiting for a call response from the interested sites. If the interoperability gateway receives a call originated from the connected LMR system, and identifies the corresponding TalkGroup as a confirmed TalkGroup, the interoperability gateway sends the call request to all interested P25 sites, and waits for a successful response from each site before setting up the call. Once a successful response is received from all interested P25 sites, the interoperability gateway sends a proceed message followed by the voice stream. In some embodiments, during the call setup period, the controller may queue up any voice data received from the connected LMR system to ensure voice integrity.

In some embodiments, a console originated call may be treated as a radio call originated from the connected LMR system. However, the user ID will indicate to the interoperability gateway that the call is originated from a dispatcher. In some embodiments, the interoperability gateway will proxy as a regular, dispatch console and setup the call on the P25 LMR system as a console originated call enabling additional features such as, for example, parallel console, console preemption, and console priority. Regarding the parallel console feature, a console originated call from a trunking LMR system will appear to the regular dispatch console users as a parallel console originated call. Regarding the console preemption feature, LMR system console originated calls will appear to the P25 LMR sites as a regular console originated call which will preempt any radio user call on the same TalkGroup on the P25 LMR system. Regarding the console priority feature, a LMR system console originated call will appear to the P25 LMR sites as a regular console originated call. As such, if the call gets queued, it will have higher priority in the queue over a radio originated call.

In some embodiments, when the interoperability gateway receives a call originated from a P25 LMR site on a confirmed TalkGroup, the interoperability gateway sends the call request to the connected LMR site through a control station. Once it receives a channel grant from the connected LMR site, the interoperability gateway sends a response to the originating P25 LMR site to complete the call setup. When the interoperability gateway receives a call originated from a P25 LMR site on an unconfirmed TalkGroup, the interoperability gateway receives the proceed message and sets up the call on the connected LMR system through a control station. Because the call is setup as unconfirmed, the P25 LMR site user may start transmitting the voice packets before the call is setup on the connected LMR system.

In some embodiments, if a P25 LMR system originated call is queued in the connected LMR system, the interoperability gateway may send a queue response to the P25 LMR site indicating the call is queued. When the call is granted in the connected LMR system, the interoperability gateway sends the successful call response to the P25 LMR system, which triggers the originating P25 LMR site to complete the call setup.

In some embodiments, if a P25 LMR system originated call is queued in the P25 LMR system, the call will already be setup in the connected LMR system while it is still queued in the P25 LMR site. When the call setup is completed in the P25 LMR system, the P25 voice data is sent to the connected LMR system.

In some embodiments, a console originated call may be setup as a radio originated call on the connected LMR system. The dispatch user ID may indicate to the connected LMR system that the call is originated by the console and, if the connected LMR system can support priority based on user ID, the console originated call may be given higher priority in the connected LMR system.

In some embodiments, the disclosed system may accommodate an emergency call, wherein the call request and voice stream from either the connected LMR system or the P25 LMR system indicates if a call is originated as an emergency call. In some embodiments, an emergency call originated on the connected LMR system will be setup as an emergency call on the P25 LMR system, and vice versa.

In some embodiments, the disclosed system may accommodate an emergency preemption, which allows a system to terminate an ongoing regular call on a TalkGroup to setup an emergency call on that TalkGroup.

In some embodiments, the disclosed system may accommodate an emergency alarm, which allows a subscriber unit to send an emergency indication over a control channel without using a voice resource. The emergency alarm is forwarded to all dispatch console positions monitoring the TalkGroup. In one embodiment, when a P25 LMR system user sends an emergency alarm, the P25 LMR site sends the emergency alarm to the interoperability gateway. If the interoperability gateway is configured for the TalkGroup, it will send the emergency alarm to the connected LMR system through a control station. The user ID of the originating P25 user may be used to send the emergency alarm. In some embodiments, the emergency alarm may be received by the Gold elite console through the connected LMR system.

In some embodiments the disclosed system may accommodate an end-to-end encryption scheme, which allows encrypted voice packets originated from the LMR system to be transmitted to the P25 system without decryption of such voice packets. The encrypted voice packets originated from the P25 system may be transmitted on the LMR system without decrypting the encrypted packets. This provides an end-to-end encryption function of LMR system.

In some embodiments an encrypted call from one system can be decrypted and re-encrypted by the interoperability gateway to provide different encryption schemes in the two systems. This allows each system to maintain its own voice security scheme while allowing end-to-end encryption.

In some embodiments, an encrypted call on one system can be decrypted by the interoperability gateway and placed on the other system as clear (non-encrypted) call. This may be useful in scenarios where encryption is required in one system and is either not required or not possible in the other system.

In some embodiments, the disclosed system may provide dynamic deployment of dispatch consoles with full access to all system TalkGroups, while the existing consoles remain active. For example, a mobile command vehicle or temporary dispatch center may be deployed in the event of large gatherings or crises.

In some embodiments, the disclosed system may provide seamless roaming by radios between P25 LMR systems without the use of direct wired connections between the LMR system infrastructures. This may be a backup or alternative to the P25 Inter Sub System Interface (IS SI) capability specified in P25 standards, which defines seamless radio roaming between P25 trunking systems.

In some embodiments, the disclosed system may provide data functionality between P25 LMR systems, users, and the dispatch equipment without the use of direct wired connections with LMR system infrastructures. This may be a backup connection for data solution or data solution between LMR system and console and related equipment deployed in a mobile command vehicle or center.

A number of additional and alternative embodiments of the disclosed system and method may be provided without departing from the spirit or scope of the present disclosure as set forth in the aspects provided herein. These various embodiments are believed to be understood by one of ordinary skill in the art in view of the present disclosure.

What is claimed is:

1. A gateway system for providing backup connection between a dispatch center and a Land Mobile Radio (LMR) system when a wired connection of the dispatch center is disconnected from the LMR system, the gateway system comprising:
    a controller configured to detect the disconnection of the wired connection between (i) the dispatch center and (ii) the LMR system, wherein the dispatch center comprises a console for a dispatcher, and wherein the LMR system comprises a plurality of service radios on a plurality of talkgroups;
    a first control station coupled to the controller, wherein the first control station is configured to establish a first voice channel connecting the console of the dispatch center to the disconnected LMR system, the voice channel comprising a first wireless radio frequency communication link between the dispatch center and the disconnected LMR system, the first voice channel carrying traffic associated with at least a first portion of the plurality of service radios on a first portion of the plurality of talk groups;
    a second control station coupled to the controller, wherein the second control station is configured to establish a second voice channel connecting the console of the dispatch center to the disconnected LMR system, the second voice channel comprising a second wireless radio frequency communication link between the dispatch center and the disconnected LMR system, the second voice channel carrying traffic associated with at least a second portion of the plurality of services radios on a second portion of the plurality of talk groups; and
    a third control station coupled to the controller, wherein the third control station is configured to establish a first control channel connecting the dispatch center to the disconnected LMR system, the first control channel comprising a third wireless radio frequency communication link between the dispatch center and the disconnected LMR system, the first control channel carrying control data associated with at least a portion of at least one of the first plurality of talk groups or the second plurality of talk groups,
    wherein the controller is further configured to, in response to detecting a reconnection of the wired connection of the dispatch center to the LMR system, deactivate the first, second, and third control station.

2. The gateway system of claim 1, wherein the plurality of service radios comprise P25 radio frequency transceivers communicating wirelessly with the disconnected LMR system.

3. A system for providing backup connection between a dispatch center and a Land Mobile Radio (LMR) system when a wired connection of the dispatch center is disconnected from the LMR system, the system comprising:
- a controller configured to detect the disconnection between the dispatch center and the LMR system;
- two or more control stations coupled to the controller via an Internet Protocol (IP) network, wherein at least one of the two or more control stations is configured to establish a separate wireless radio frequency communication link between the dispatch center and the disconnected LMR system; and
- wherein the controller is further configured to, in response to detecting the disconnection, allocate a first one of the two or more control stations as a control channel comprising a first radio frequency for a plurality of talk groups for the disconnected LMR system, and allocate a second one of the two or more control stations as a voice channel comprising a second radio frequency for communicating with the disconnected LMR system over the voice channel by transmitting and receiving voice calls for the plurality of talk groups, between the disconnected LMR system and a console of the dispatch center,
- wherein the voice calls comprise radio transmissions of a plurality of service radios communicating wirelessly and on the plurality of talk groups with the disconnected LMR system, and
- a first portion of the voice calls being between services radios and a second portion of the voice calls being between the dispatch center associated with the disconnected wired connection to the disconnected LMR system and services radios.

4. The system of claim 3, wherein each of the two or more control stations mirror a channel supported by the disconnected LMR system.

5. The system of claim 3, wherein each of the two or more control stations are configured to monitor the control channel of the disconnected LMR system.

6. The system of claim 3,
- wherein the control channel and the voice channel are configured to terminate in response to the reconnection of the connection of the dispatch center and the disconnected LMR system.

7. The system of claim 3, wherein the controller is configured to provide an interface between the system and the console of the dispatch center.

8. The system of claim 3, wherein the system is configured to process voice calls received from the plurality of service radios communicating wirelessly with the disconnected LMR system via the control station allocated as the voice channel, wherein the plurality of service radios comprise P25 radio frequency transceivers communicating wirelessly and on the plurality of talk groups with the disconnected LMR system.

9. The system of claim 3, wherein the system is configured to process voice calls placed from the dispatch center to the disconnected LMR system via the control station allocated as the voice channel.

10. A method for providing backup connection between a dispatch center and a Land Mobile Radio (LMR) system when a wired connection of the dispatch center is disconnected from the LMR system, the method comprising:
- detecting, via a controller, the disconnection of the wired connection between (i) the dispatch center and iii) the LMR system, wherein the dispatch center comprises a console for a dispatcher, and wherein the LMR system comprises a plurality of service radios on a plurality of talk groups;
- establishing, via a first control station coupled to the controller, a first voice channel comprising a first wireless radio frequency communication link between the dispatch center and the disconnected LMR system, the first voice channel carrying traffic associated with at least a first portion of the plurality of service radios on a first portion of the plurality of talk groups;
- establishing, via a second control station coupled to the controller, a second voice channel comprising a second wireless radio frequency communication link between the dispatch center and the disconnected LMR system, the second voice channel carrying traffic associated with at least a second portion of the plurality of service radios on a second portion of the plurality of talk groups; and
- establishing, via a third control station coupled to the controller, a first control channel connecting the dispatch center to the disconnected LMR system, the first control channel comprising a third wireless radio frequency communication link between the dispatch center and the disconnected LMR system, the first control channel carrying control data associated with at least a portion of at least one of the first plurality of talk groups or the second plurality of talk groups,
- wherein the controller is further configured to, in response to detecting a reconnection of the wired connection of the dispatch center to the LMR system, deactivate the first, second, and third control station.

11. The method of claim 10, wherein the controller is configured to provide an interface between the LMR system and the console of the dispatch center.

* * * * *